US008065683B2

(12) United States Patent
Sato et al.

(10) Patent No.: US 8,065,683 B2
(45) Date of Patent: Nov. 22, 2011

(54) APPARATUS FOR TRACKING WORK PROCESS AND COMPUTER PRODUCT

(75) Inventors: Hirokazu Sato, Kawasaki (JP); Toshiyuki Ito, Kawasaki (JP); Kazuo Mineno, Kawasaki (JP); Hideki Okamoto, Kawasaki (JP); Yasuomi Iriyama, Kawasaki (JP); Yasushi Toriwaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1772 days.

(21) Appl. No.: 11/186,530

(22) Filed: Jul. 21, 2005

(65) Prior Publication Data

US 2006/0230404 A1    Oct. 12, 2006

(30) Foreign Application Priority Data

Apr. 7, 2005    (JP) .................................. 2005-111197

(51) Int. Cl.
*G06F 9/46* (2006.01)
*G06F 11/00* (2006.01)
*G06Q 10/00* (2006.01)

(52) U.S. Cl. .............. 718/106; 714/15; 714/20; 714/25; 714/51; 705/7.26; 705/7.27; 705/7.38; 705/301

(58) Field of Classification Search .................. 718/106
See application file for complete search history.

(56) References Cited

U.S. PATENT DOCUMENTS

| 5,636,376 | A * | 6/1997 | Chang ............................ 717/127 |
| 5,870,698 | A * | 2/1999 | Riedel et al. ................... 702/182 |
| 7,076,767 | B1 * | 7/2006 | Williams ....................... 717/127 |
| 7,165,106 | B2 * | 1/2007 | Matsumura et al. ........... 709/224 |
| 7,584,082 | B2 * | 9/2009 | Orofino, II ........................ 703/6 |
| 7,620,583 | B2 * | 11/2009 | Sundel .............................. 705/37 |
| 2002/0029262 | A1 * | 3/2002 | Matsumura et al. ........... 709/223 |
| 2003/0101128 | A1 * | 5/2003 | Abernethy ....................... 705/37 |
| 2003/0105704 | A1 * | 6/2003 | Sundel .............................. 705/37 |
| 2003/0200310 | A1 * | 10/2003 | Matsumura et al. ........... 709/224 |
| 2004/0260726 | A1 * | 12/2004 | Hrle et al. .................... 707/104.1 |

FOREIGN PATENT DOCUMENTS

| JP | 01-231138 | 9/1989 |
| JP | 08-335111 | 12/1996 |
| JP | 10-063747 | 3/1998 |
| JP | 11-261591 | 9/1999 |
| JP | 11-338742 | 12/1999 |
| JP | 2003-280926 | 10/2003 |
| JP | 2004-021572 | 1/2004 |

OTHER PUBLICATIONS

JP-11-261591, Published 1999, Machine Translated Version, pp. 1-5.*
Notice of Rejection issued in Japanese Patent App. No. 2005-111197, issued Aug. 31, 2010.
Masayuki Ebata et al.; "Visualization System for Multiple Logs using Timelines;" Multimedia, Distributed, Cooperative and Mobile (DICOMO) Symposium; Jul. 2004.

* cited by examiner

*Primary Examiner* — Jennifer To
(74) *Attorney, Agent, or Firm* — Greer Burns & Crain, Ltd.

(57) ABSTRACT

In a work-process tracking system, each of event-data collecting threads collects event data from each of work systems. A storing thread stores the event data collected in a database. When a termination instruction is received, a thread in operation is terminated. For example, when an instruction to start (or terminate) an event-data collecting process is received, a control unit initiates (or terminates) the event-data collecting thread. Similarly, when an instruction to start (or terminate) a storing process, the control unit initiates (or terminates) the storing thread.

6 Claims, 11 Drawing Sheets

FIG.7

| PROCESS | TYPE | DAY OF WEEK | START TIME | END TIME |
|---|---|---|---|---|
| EVENT-DATA COLLECTING PROCESS | EVERY WEEK | DAY OF WEEK | 12:00 | 17:00 |
| STORING PROCESS | EVERY DAY | — | 0:00 | 23:30 |
| ALERT-DATA COLLECTING PROCESS | EVERY WEEK | MON-FRI | 12:00 | — |
| | EVERY WEEK | MON-FRI | 18:00 | — |
| TRACKING PROCESS | EVERY DAY | — | 13:00 | 17:00 |
| BACKUP PROCESS | EVERY WEEK | SUN | 0:00 | — |

FIG.10

| PRIORITY | PROCESS NAME |
|---|---|
| 1 | STORING PROCESS |
| 2 | EVENT-DATA COLLECTING PROCESS |
| 3 | TRACKING PROCESS |
| 4 | ALERT-DATA COLLECTING PROCESS |
| 5 | BACKUP PROCESS |

FIG.11

| CONDITION | CPU USE RATE | AND/OR | MEMORY USE RATE | CONTROL |
|---|---|---|---|---|
| A | 100% OR MORE | AND | 80% OR MORE | TERMINATE PROCESS WITH PRIORITY 1 OR LOWER |
| B | 80% OR MORE | OR | 80% OR MORE | TERMINATE PROCESS WITH PRIORITY 2 OR LOWER |
| C | 65% OR MORE | OR | 65% OR MORE | TERMINATE PROCESS WITH PRIORITY 3 OR LOWER |
| D | 40% OR MORE | OR | 55% OR MORE | TERMINATE PROCESS WITH PRIORITY 4 OR LOWER |
| E | 20% OR MORE | OR | 50% OR MORE | TERMINATE PROCESS WITH PRIORITY 5 OR LOWER |

APPARATUS FOR TRACKING WORK PROCESS AND COMPUTER PRODUCT

CROSS-REFERENCE TO RELATED APPLICATIONS

This application is based upon and claims the benefit of priority from the prior Japanese Patent Application No. 2005-11197, filed on Apr. 7, 2005, the entire contents of which are incorporated herein by reference.

BACKGROUND OF THE INVENTION

1. Field of the Invention

The present invention relates to an apparatus for tracking a work process that indicates a workflow in various work systems, and a computer product.

2. Description of the Related Art

Due to a phase-in of work systems along with growth of a company or introduction of individual work system for each business unit, it is often the case that various work systems are present within a company. Because such various work systems have a complex relationship therebetween, it is difficult to grasp works as a whole. For example, such a problem can arise that it is difficult to understand progress of an entire work, problems in the work process, and what kind of an effect is expected when an investment in a new information technology (IT) is made for which part in a business.

For this reason, analysis of a work process that indicates a flow of work in the various work systems has conventionally been performed when works in operation are to be improved. Thus, it is determined which part has a problem and what should be improved. A workflow system is a system used for analyzing a flow of works in the work systems. The workflow system in general includes an existing flow engine and an application to be automatically executed in the order according to a workflow presented.

A workflow supporting system and a workflow supporting method that enables to refer to managing information including history and progress and to track a flow even for a workflow that range various different work systems or non-routine works are disclosed in, for example, Japanese Patent Application Laid-Open Publication No. H10-63747.

However, in the conventional technology described above, it is impossible to grasp relation among applications that branches into various processes at some midpoints. In such case, to grasp the relation among the applications, the work process and an analyzing scheme have to be reviewed by, for example, dividing the workflow into processes to be analyzed separately.

In addition, most of the existing work systems do not process works according to a workflow. Therefore, to track a work flow in different work systems, it is necessary to collect data including processed data and unprocessed data by accessing each of the work systems to analyze the data. Such workflow tracking is practically impossible.

SUMMARY OF THE INVENTION

It is an object of the present invention to solve at least the problems in the conventional technology.

A computer-readable recording medium according to one aspect of the present invention stores a computer program for tracking a work process. The computer program enables tracking of the work process that indicates a flow of a work among a plurality of work systems, and makes a computer execute performing a plurality of processes for tracking the work process; and controlling the performing so that initiation and termination of the processes are achieved independently from each other.

An apparatus for tracking a work process according to another aspect of the present invention tracks a work process that indicates a flow of a work among a plurality of work systems, and includes a performing unit that performs a plurality of processes for tracking the work process; and a control unit that controls the performing unit so that initiation and termination of the processes are achieved independently from each other.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 7 is a table of a schedule;

FIG. 10 is a table of correspondence between a process and priority;

FIG. 11 is a table of a condition setting file; and

DETAILED DESCRIPTION OF THE PREFERRED EMBODIMENTS

Exemplary embodiments according to the present invention will be described in detail below with reference to the attached drawings.

Figure 1:
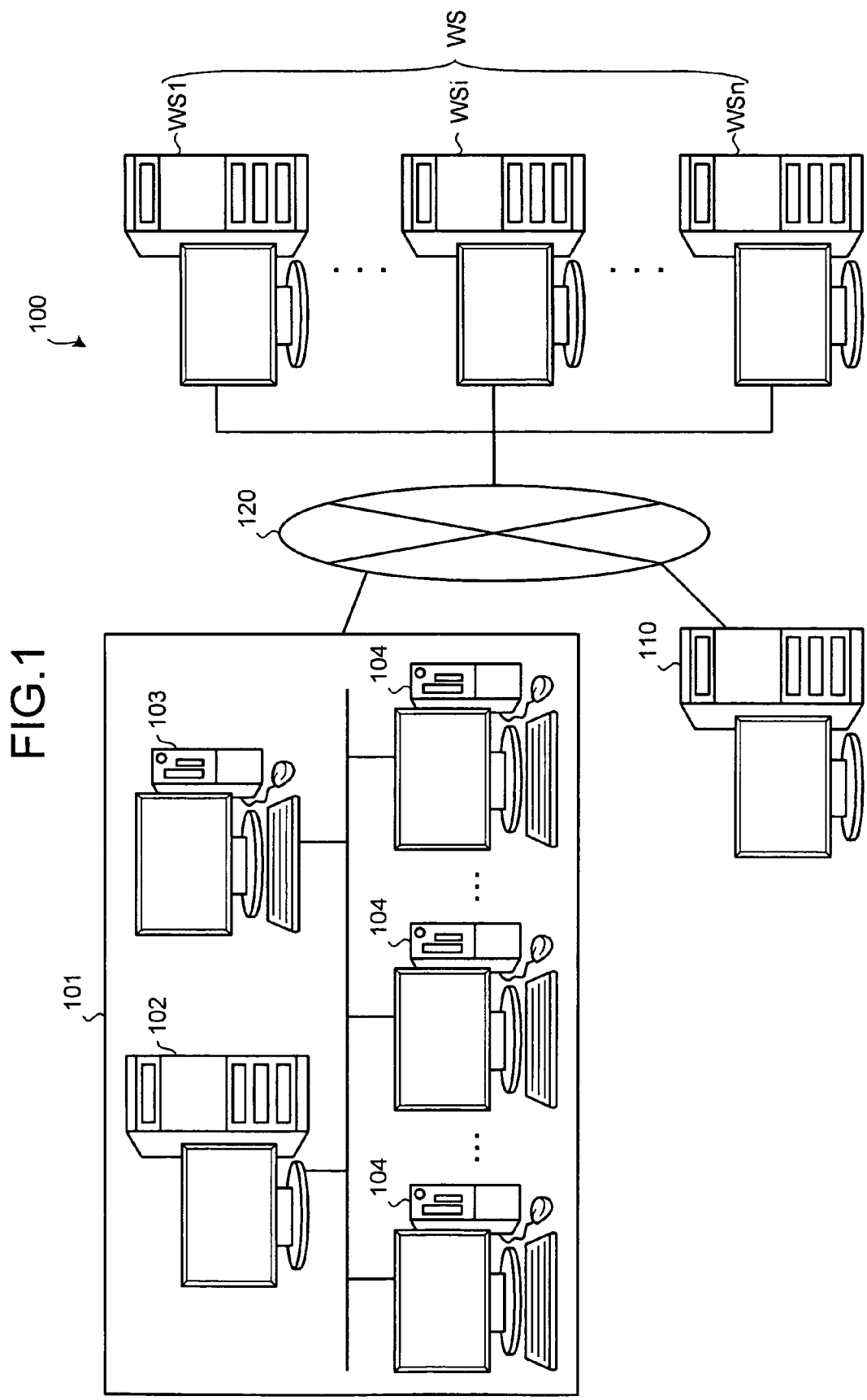
FIG. 1 is a schematic of a system for tracking a work process according to an embodiment of the present invention.

FIG. 1 is a schematic of a system for tracking a work process according to an embodiment of the present invention.

As shown in FIG. 1, a work process tracking system 100 includes an internal system 101, a work system group WS, and a backup server 110, which are inter-communicably connected to one another via a network 120, such as the Internet or a wide area network (WAN).

The internal system 101 includes a work process tracking apparatus 102, a managing terminal 103, and tracking terminals 104, which are inter-communicably connected to one another to form an internal network, such as a local-area network (LAN). The work process tracking apparatus 102 performs tracking, monitoring, and management of the work process. The managing terminal 103 sets a schedule of processes regarding instructions for a start or a termination operation, tracking, monitoring, and management of the work process tracking apparatus 102. The tracking terminals 104 each access the work process tracking apparatus 102 to make a request for tracking a target work process, specify a tracking target, and display the tracking results.

The work system group WS is a 'set of a plurality of different work systems WS1 to WSn defined according to a work model. Each work system WSi is not aware of the state of operation of another work system WSj (j≠i). The number n of work systems WS1 to WSn in the work system group WS is assumed to be four for simplifying description. For example, if the work model handles from orders to manufacturing and marketing of products, the work system group WS is formed of four work systems, that is, an order-accepting and order-placing system (work system WS1), an inventory management system (work system WS2), a production system (work system WS3), and a shipping system (work system WS4). The work process indicates a work flow among the work systems WS1 to WSn. Therefore, the work process in this case is a series of processes from an order-accepting and order-placing process, an inventory managing process, a producing process, and then a shipping process.

In practice, the number n of work systems WS1 to WSn can be several tens to hundreds or more. As such, the work process to be tracked has been expanded in size and diversified. In the present embodiment, such expanded and diversified work process can be efficiently tracked, monitored, and managed. Also, the backup server 110 backs up information stored in the work process tracking apparatus 102.

Figure 2:
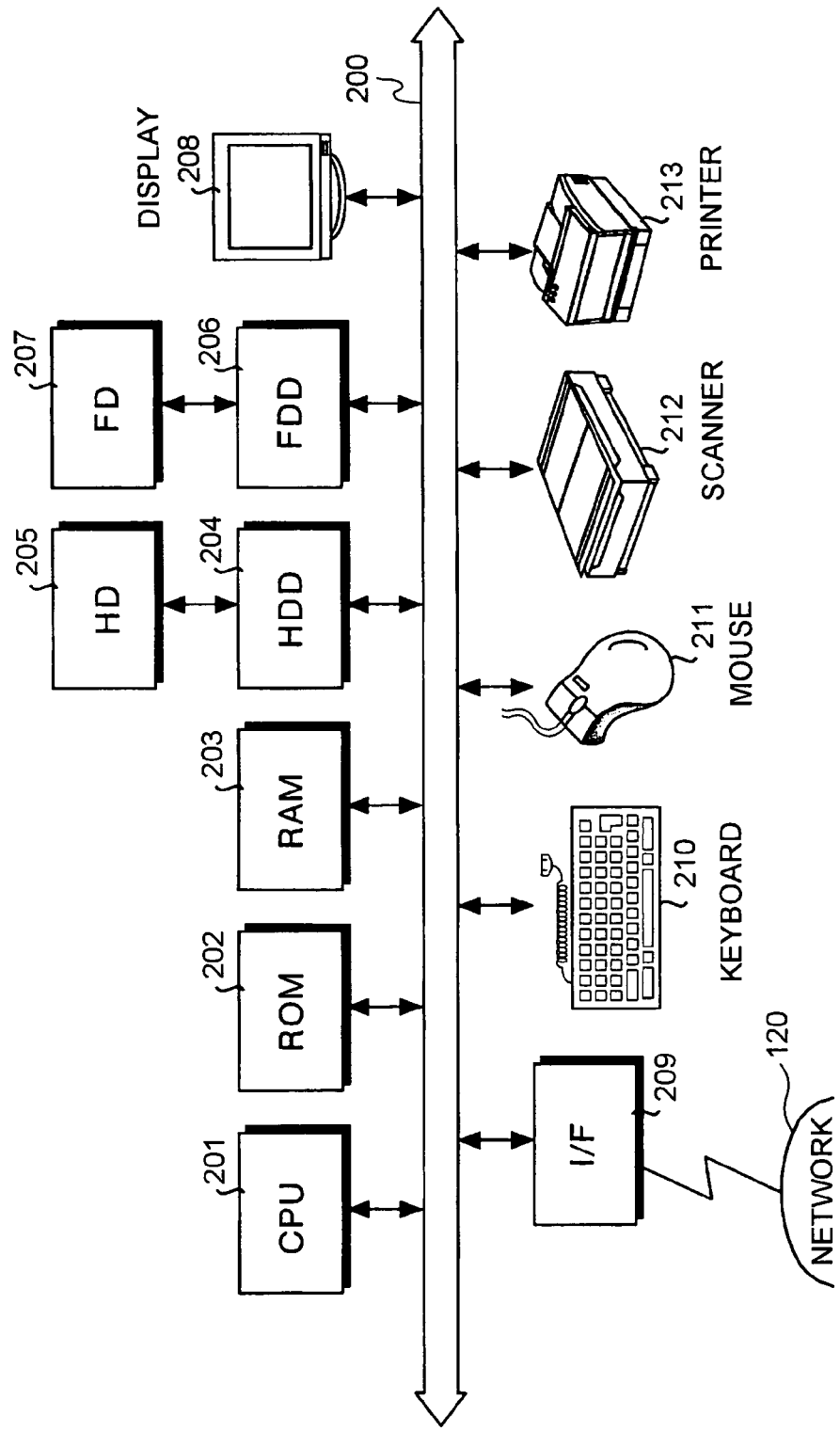
FIG. 2 is a schematic of a hardware configuration of an apparatus for tracking a work process according to the embodiment.

FIG. 2 is a schematic of a hardware configuration of the work process tracking apparatus 102, the managing terminal 103, the tracking terminals 104, the backup server 110, and the work systems WS1 to WSn (these components are collectively referred to as "the work process tracking apparatus 102 and their components") according to the embodiment.

As shown in FIG. 2, the work process tracking apparatus 102 and other components include a central processing unit (CPU) 201, a read-only memory (ROM) 202, a random-access memory (RAM) 203, a hard disk drive (HDD) 204, a hard disk (HD) 205, a flexible disk drive (FDD) 206, a flexible disk (FD) 207, which is one example of a removable recording medium, a display 208, an interface (I/F) 209, a keyboard 210, a mouse 211, a scanner 212, and a printer 213. The components are connected to one another via a bus 200.

The CPU 201 controls the entire work process tracking apparatus 102 and other components. On the ROM 202, a program, such as a boot program, is recorded. The RAM 203 is used as a work area for the CPU 201. The HDD 204 controls read/write of data from/to the HD 205 under the control of the CPU 201 in the HD 205, data written under the control of the HDD 204 is stored.

The FDD 206 controls read/write of data from/to the FD 207 under the control of the CPU 201. The FD 207 causes data written under the control of the FDD 206 to be stored or causes the data stored in the FD 207 to be read by the work process tracking apparatus 102 and other components.

As a removable recording medium, besides the FD 207, a compact disc read-only memory (CD-ROM), such as compact disc-recordable (CD-R) and compact disc rewritable (CD-RW), magneto-optical (MO) disk, digital versatile disk (DVD), and memory card, may be used. The display 208 displays data, such as documents, images, and functional information including a cursor, icon, or tool box. As the display 208, a cathode-ray tube (CRT), for example, thin-film transistor (TFT) liquid crystal display, or plasma display can be adopted.

The I/F 209 is connected to the network 120, such as the Internet, via a communication line, and is also connected via the network 120 to another apparatus. The I/F 209 serves as an interface between the network 120 and the inside of the device, and controls data inputs to and outputs from an external device. As the I/F 209, a modem or LAN adaptor can be adopted.

The keyboard 210 includes keys for inputting characters, numbers, various instructions, etc., for data inputs, and may be an input pad of a touch panel type or ten keys, for example. The mouse 211 is used to cause a cursor to be moved, an area to be selected, or a window to be moved or changed in size, for example. The mouse 211 may be arbitrary, such as a track ball or joystick, as long as it has a function as a pointing device.

The scanner 212 optically reads an image, and captures image data into the work process tracking apparatus 102 and other components. The scanner 212 may have an optical character recognition (OCR) function. Also, the printer 213 prints image data and document data. As the printer 213, a laser printer or ink jet printer may be adopted.

Figure 3:
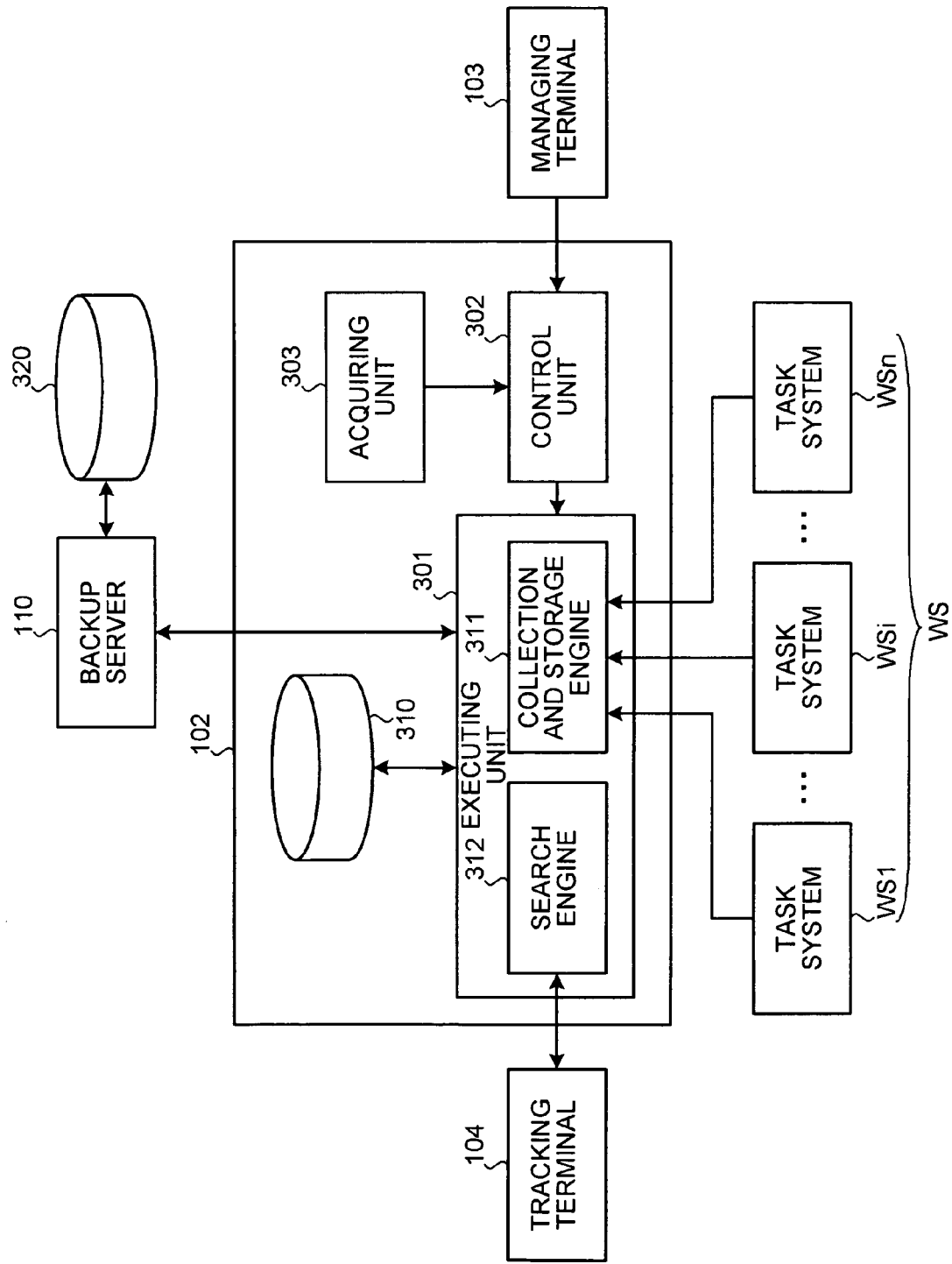
FIG. 3 is a block diagram of a functional configuration of the apparatus for tracking a work process.

FIG. 3 is a block diagram of a functional configuration of the work process tracking apparatus 102. As shown in FIG. 3, the work process tracking apparatus 102 includes an executing unit 301, a control unit 302, an acquiring unit 303, and a database 310.

First, the executing unit 301 includes a collection and storage engine 311 and a search engine 312. The collection and storage engine 311 collects event data from each of the work systems WS1 to WSn and stores the collected event data in the database 310. The collection and storage engine 311 can also collect alert data from the event data stored in the database 310. Furthermore, the collection and storage engine 311 can move the event data stored in the database 310 to a database 320 in the backup server 110 for backup. The event data is data regarding the execution of a work in each of the work systems WS1 to WSn, including information about the time of execution of the work or other information regarding the work.

For example, if the work system WSi is the order-accepting and order-placing system WS1, the event data includes, for example, identification information of a person in charge of order-accepting and order-placing (person's name or code), identification information of the ordered product (product's name or code), an order-accepting time and an order-placing time of notifying the subsequent systems (the inventory management system WS2 and the production system WS3), the number of products ordered, and a price of the product.

If the work system WSi is the inventory management system WS2, the event data includes, for example, identification information of a person in charge of inventory management (person's name or code), identification information of the product for inventory management (product's name or code), an inventory-management check time, and the number of products for inventory management.

If the work system WSi is the production system WS3, the event data includes, for example, identification information of a person in charge of production (person's name or code), identification information of a product to be produced (product's name or code), the number of products produced, the state of progress (a production start time and date, information as to whether production has been completed, the remaining number of products to be produced, the number of products per unit time, a scheduled production end time and date, and a production completed time and date).

If the work system WSi is the shipping system WS4, the event data includes, for example, identification information of a person in charge of shipping (name or code of person), identification information of the product to be produced (name or code of product), a scheduled shipping date, and information as to whether the product has been shipped.

The alert data contains information indicative of an abnormality or alert regarding any one or more of the work systems WS1 to WSn. For example, if the work system WSi is the order-accepting and order-placing system WS1, alert data indicating that an order of a product has not yet been placed with the production system WS3 after a predetermined time period can be collected from the event data stored in the database 310.

If the work system WSi is the inventory management system WS2, alert data indicative of products of which number is less than a predetermined number or the number of such products can be collected from the event data stored in the database 310. If the work system WSi is the production system WS3, alert data indicating that the number of products produced per unit time is equal to or smaller than a predetermined number can be collected from the event data stored in the database 310. If the work system WSi is the shipping system WS4, information about delay of the scheduled shipping data can be collected as alert data from the event data stored in the database 310.

The search engine 312 accepts a request for tracking a work process from any of the tracking terminals 104 and searches the database 310. For example, upon acceptance of identification information of a product to be tracked, event data regarding the product to be tracked is retrieved from the database 310. The search results are then output in time sequence to the tracking terminal 104 that has issued the tracking request, thereby causing the search results to be displayed on a display screen of that tracking terminal 104 as the tracking results.

The control unit 302 controls the executing unit 301 according to a preset schedule. Specifically, the control unit 302 controls the execution of an event-data collecting process, an event-data storing process, an alert-data collecting process, and a backup process by the collection and storage engine 311 of the executing unit 301 for each of the work systems WS1 to WSn, and the execution of a tracking process by the search engine 312. Specifically, for example, a process is executed when the start time of a process comes, and a process is terminated when the end time of the process comes.

Upon acceptance of an instruction to start a process from the managing terminal 103, the process is started to run. Upon acceptance of an instruction to terminate a process running, the execution of the process is terminated. The control unit 302 can also control the executing unit 301 by determining executable processes and non-executable processes based on preset priority of each process.

The acquiring unit 303 acquires information (hereinafter, "operation-state information") regarding the state of operation of the work process tracking apparatus 102. The operation-state information includes, for example, information about loads on the work process tracking apparatus 102, such as a memory use rate of the CPU 201, the RAM 203 or the like forming the work process tracking apparatus 102. From the use rate of the CPU 201 or memory, the control unit 302 can determine executable processes and non-executable process for controlling the executing unit 301. Specifically, the executing unit 301, the control unit 302, and the acquiring unit 303 achieve their functions by, for example, the CPU 201 executing a program recorded on the ROM 202, the RAM 203, the HD 205, or the like, or by the I/F 209, shown in FIG. 2.

Figure 4:
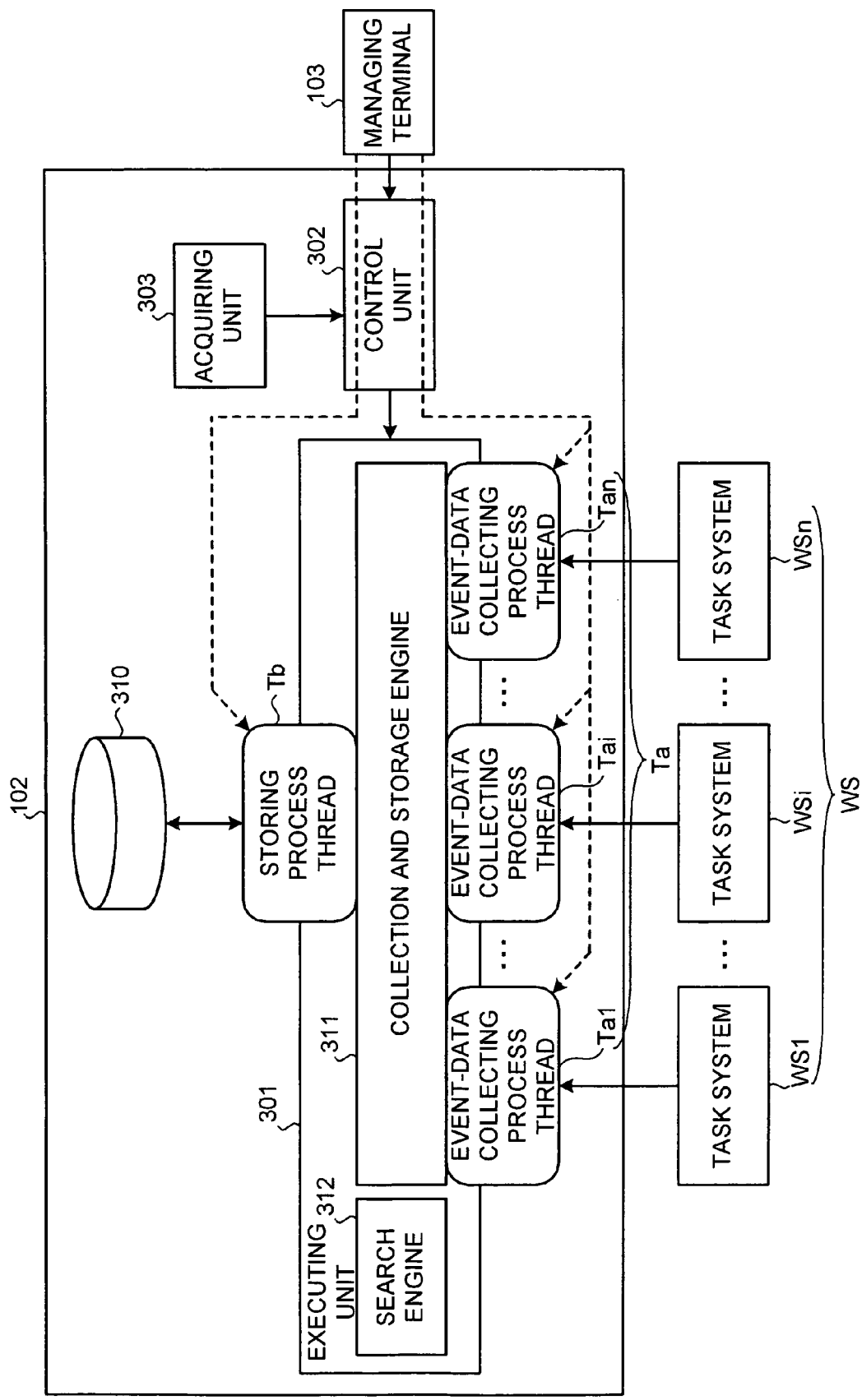
FIG. 4 is a schematic for illustrating an event-data collecting process and a storing process performed on each work system by an executing unit.

FIG. 4 is a schematic for illustrating an event-data collecting process and a storing process to be performed by the executing unit 301 on each of the work systems WS1 to WSn. In FIG. 4, when the start time of an event-data collecting process comes according to a schedule, the collection and storage engine 311 sets up an event-data collecting process thread Ta (Ta1 to Tan) for each of the work systems WS1 to WSn. Also, when the end time of the event-data collecting process comes according to the schedule, the collection and storage engine 311 terminates the event-data collecting process thread Ta (Ta1 to Tan) for each of the work systems WS1 to WSn.

Similarly, when the start time of a storing process comes according to the schedule, the collection and storage engine 311 sets up a storing process thread Tb. Also, when the end time of the storing process comes according to the schedule, the collection and storage engine 311 terminates the storing process thread Tb. More than one thread, such as the threads Ta and Tb, can be set up by, for example, multi thread programming with java (registered trademark).

In the event-data collecting process threads Ta1 to Tan, event data is collected from the respective one of work systems WS1 to WSn. In the storing process thread Tb, the event data collected through the event-data collecting process threads Ta1 to Tan is stored in the database 310. Upon acceptance of an instruction to terminate the process from the managing terminal 103, the running thread is terminated. For example, upon acceptance of an instruction to start (or terminate) an event-data collecting process from the work system WSi, the control unit 302 starts (or terminates) the relevant event-data collecting process thread Tai. Similarly, upon acceptance of an instruction to start (or terminate) a storing process, the control unit 302 starts (or terminates) the storing process thread Tb.

As such, the threads can be individually started or terminated when the work process tracking apparatus 102 or the work system WSi requires maintenance or when the work system WSi has information changes or the like. Therefore, an event-data collecting process from another work system WSj (j≠i) can be kept being performed.

Also, even when the work system group WS to be managed is diversified to cause the control of the schedule to be complicated, in each of the event-data collecting process threads Ta1 to Tan, the start state of the storing process thread Tb can be monitored to terminate the relevant one of the event-data collecting process threads Ta1 to Tan for the work systems WS1 to WSn upon termination of the storing process thread Tb. Therefore, maintenance of the database 310, information changes, or the like can be performed without considering the start state of each of the work systems WS1 to WSn.

Also in this case, by using multi thread programming, for example, the state of the storing process thread Tb is periodically monitored in each separate one of the event-data collecting process threads Ta1 to Tan. Depending on the state of the storing process thread Tb, the event-data collecting process can be started or terminated.

Figure 5:
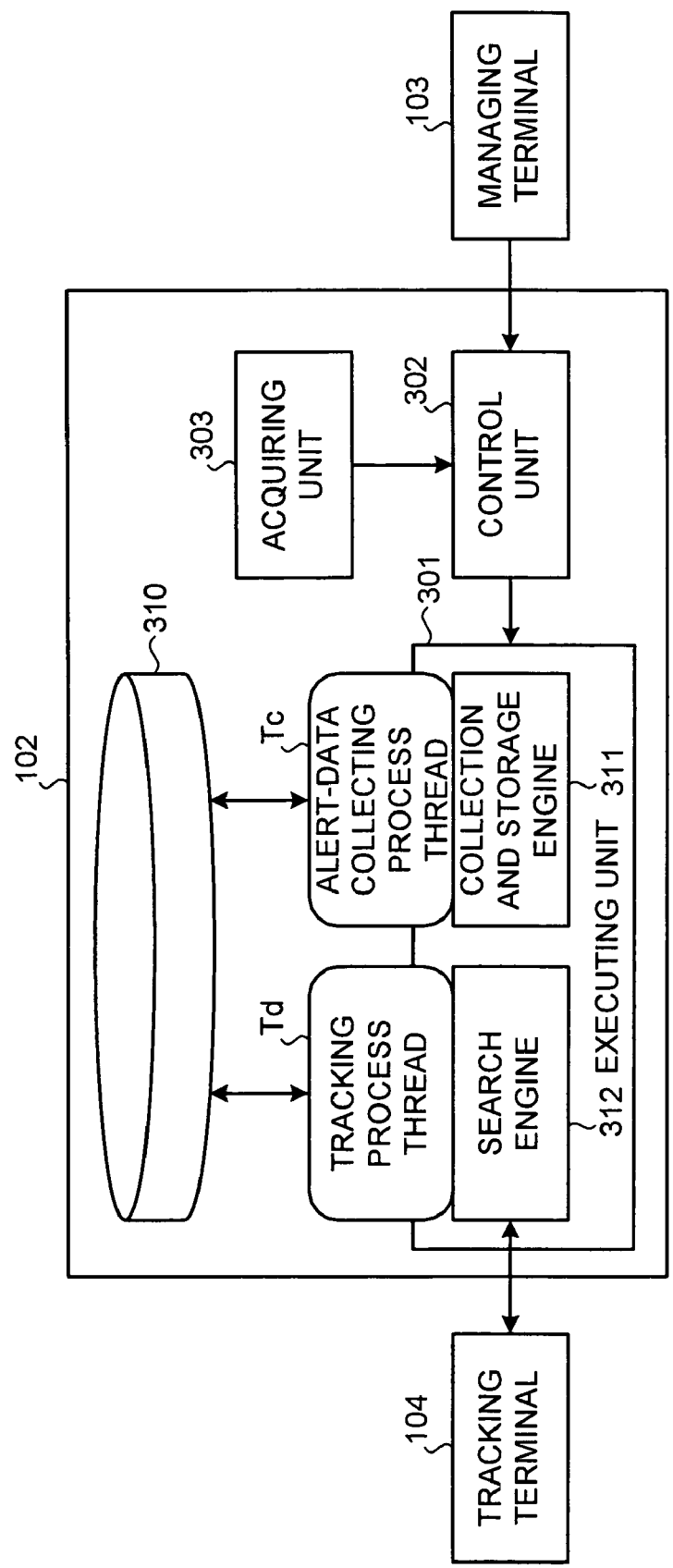
FIG. 5 is a schematic for illustrating an alert-data collecting process and a tracking process performed by the executing unit.

FIG. 5 is a schematic for illustrating an alert-data collecting process and a tracking process performed by the executing unit 301. As shown in FIG. 5, when the start time of an alert-data collecting process comes according to the schedule, the collection and storage engine 311 sets up an alert-data collecting process thread Tc to collect alert data from the database 310. Upon completion of collection of all pieces of alert data, the alert-data collecting process thread Tc is terminated.

Also, upon acceptance of a tracking instruction from any of the tracking terminals 104, the search engine 312 sets up a tracking process thread Td to accept a request for tracking the work process from the tracking terminal 104 and search the database 310, as described above. Through this search, event data and alert data, if any, are extracted and output to the tracking terminal 104 as the tracking results.

Figure 6:
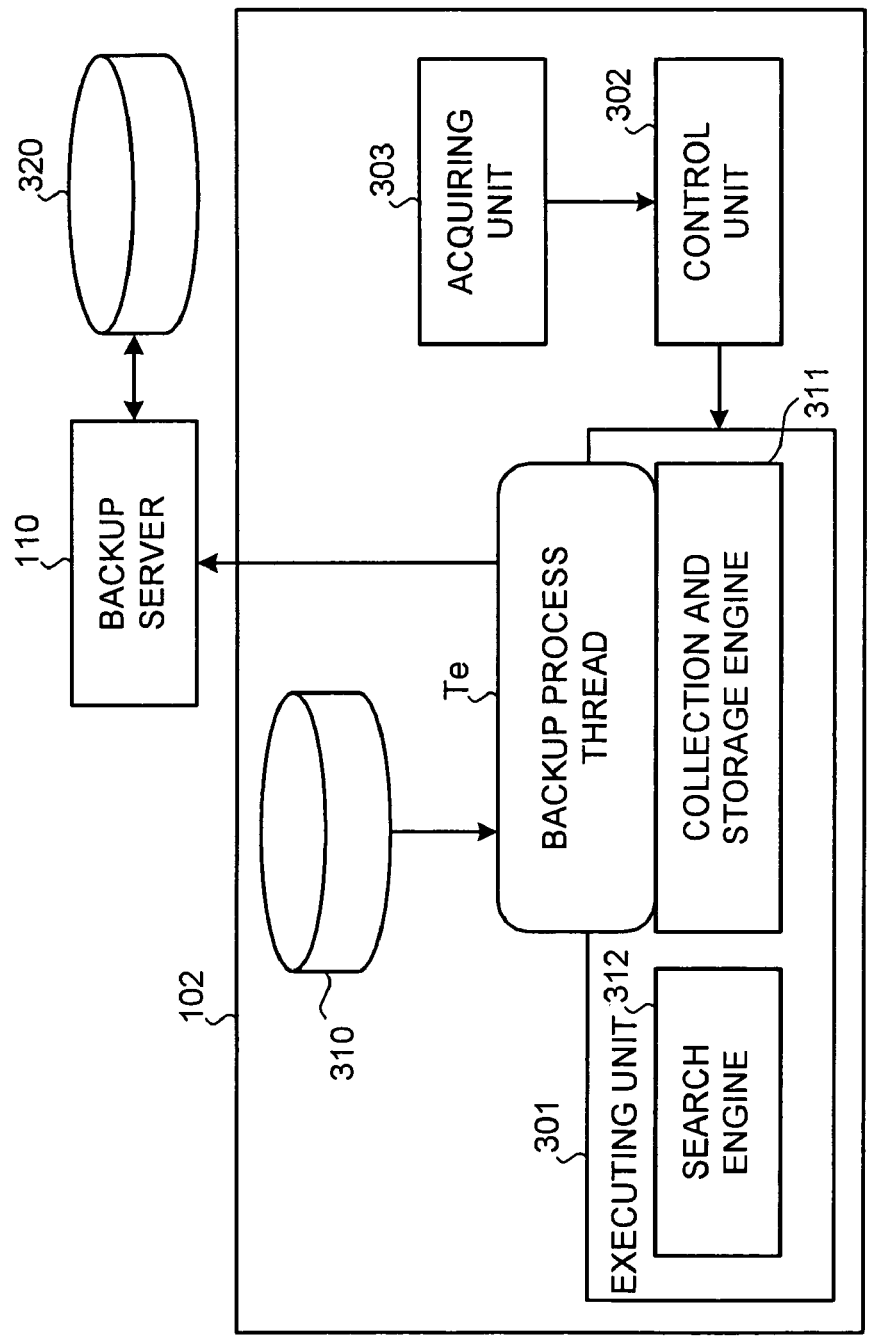
FIG. 6 is a schematic for illustrating a backup process performed by the executing unit.

FIG. 6 is a schematic for illustrating a backup process performed by the executing unit 301. As shown in FIG. 6, when the start time of a backup process comes according to the schedule, the collection and storage engine 311 sets up a backup process thread Te to transfer the information in the database 310 to the backup server 110. With this, the information in the database 310 can be moved to the database 320 of the backup server 110. Upon completion of the backup process, the backup process thread Te is terminated.

FIG. 7 is a table of a schedule. The control unit 302 refers this schedule 700. The control unit 302 controls the executing unit 301 according to this schedule 700. As shown in FIG. 7, an process item 701 includes a name of a process to be set up as a thread. A type item 702 includes an execution cycle of the process, such as "every day" and "every week".

A day-of-week item 703 contains a day of week when the process is to be executed. A start time item 704 contains a process start time, and an end time item 705 contains a process end time. For example, the event-data collecting process starts an event-data collecting process thread Ta at 12:00 and terminates the event-data collecting process thread at 17:00, every week from Monday through Friday. Regarding a tracking process, the schedule indicates that any of the tracking terminals 104 can start a tracking process thread Td every day from 13:00 to 17:00. The contents of the schedule 700 can be set by operating the managing terminal 103 through an electronic document in an extensible markup language (XML) format.

Figure 8:
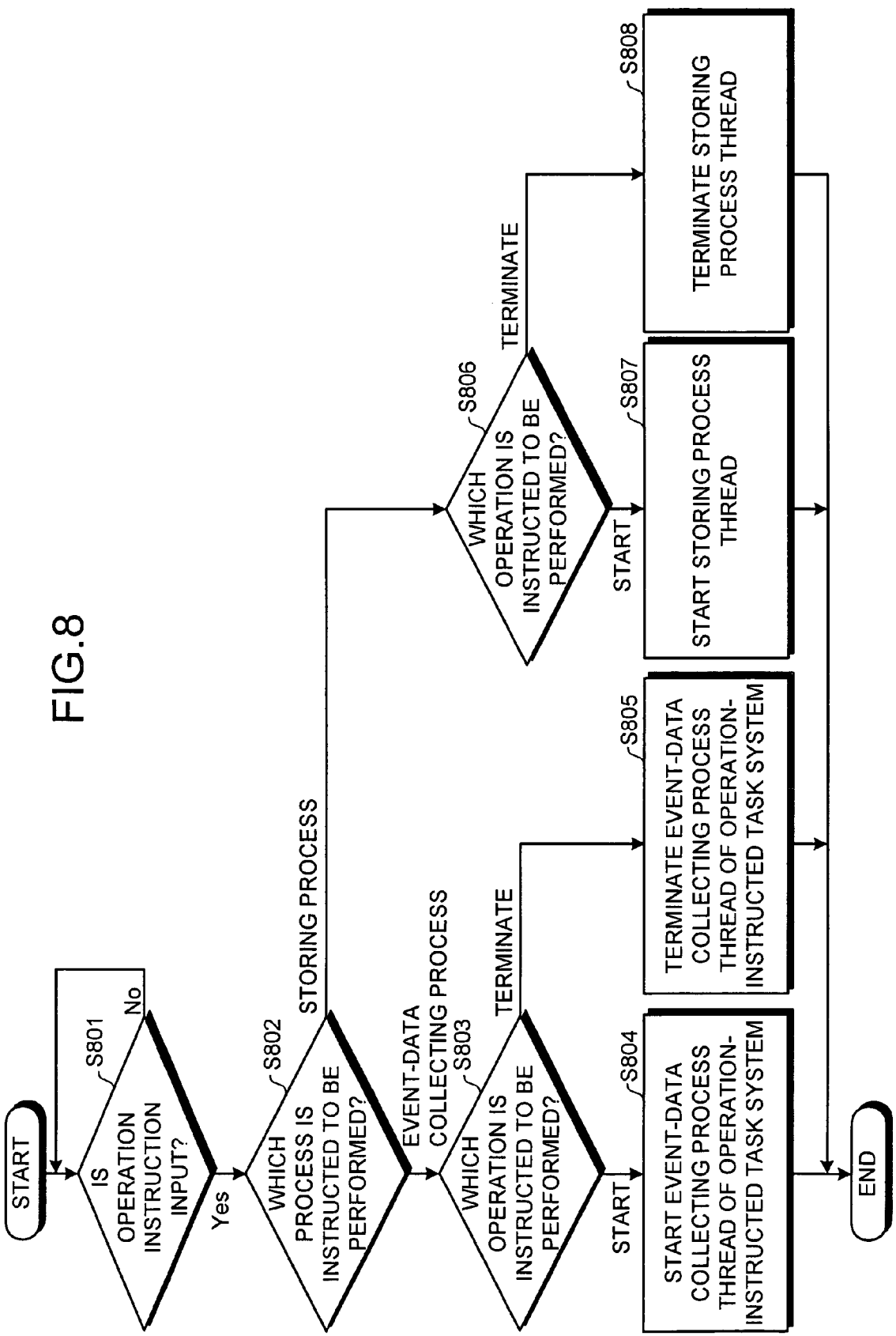
FIG. 8 is a flowchart of a work-process tracking process according to the embodiment.

FIG. 8 is a flowchart of a work-process tracking process according to the embodiment. As shown in FIG. 8, when an operation instruction has been input from the managing terminal 103 ("YES" at step S801), a process intended by the instruction is determined (step S802). If the process intended is an event-data collecting process of an arbitrary work system ("EVENT-DATA COLLECTING PROCESS" at step S802), an operation instructed to be performed is determined (step S803).

If the operation instructed to be performed is a start operation ("START" at step S803), the event-data collecting process thread Tai of the work system WSi to which the operation is to be performed is started (step S804). On the other hand, if the operation instructed to be performed is a termination operation ("TERMINATE" at step S803), the event-data collecting process thread Tai of the work system WSi to which the operation is to be performed is terminated (step S805).

At step S802, if the process intended by the instruction is a storing process ("STORING PROCESS" at step S802), an operation instructed to be performed is determined (step S806). If the operation instructed to be performed is a start operation ("START" at step S806), the storing process thread Tb is started. On the other hand, if the operation instructed to be performed is a termination operation ("TERMINATE" at step S806), the storing process thread Tb is terminated (step S808).

As such, the threads can be individually started or terminated when the work process tracking apparatus 102 or any of the work systems WS1 to WSn requires maintenance or when the work systems WSi has information changes or the like. Therefore, an event-data collecting process from another work system WSj (j≠i) can be kept to be performed.

Figure 9:
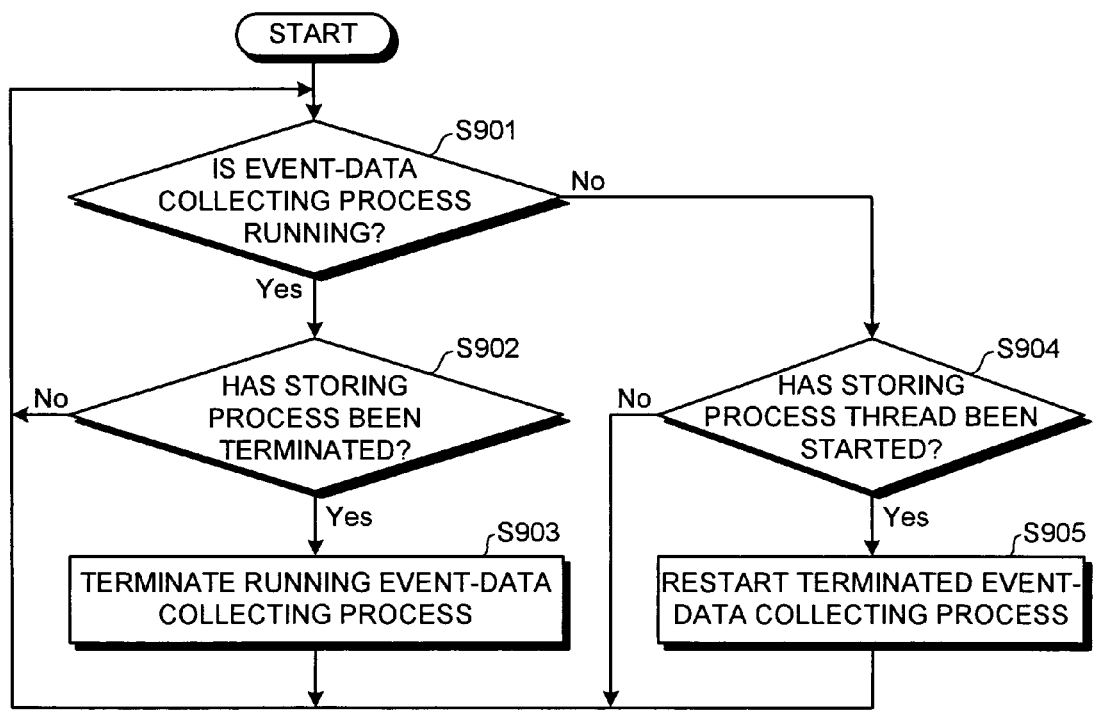
FIG. 9 is a flowchart of the work-process tracking process according to the embodiment.

FIG. 9 is another flowchart of the work-process tracking process according to the embodiment. As shown in FIG. 9, when the event-data collecting process is running ("YES" at step S901), it is determined whether the storing process has been terminated (step S902).

If the storing process has been terminated ("YES" at step S902), the event-data collecting process running is terminated (step S903), and the procedure then goes to step S901 to determine whether the event-data collecting process is running. At step S902, if the storing process has not been terminated ("NO" at step S902), the procedure goes to step S901 to determine whether the event-data collecting process is running.

On the other hand, at step S901, if the event-data collecting process is not running ("NO" at step S901), it is determined whether the storing process thread Tb has been started (step S904). If the storing process thread has been started ("YES" at step S904), the currently-terminated event-data collecting process is restarted (step S905). The procedure then goes to step S901 to determine whether the event-data collecting process is running. Also, at step S904, if the storing process thread Tb has not been started ("NO" at step S904), the procedure goes to step S901 to determine whether the event-data collecting process is running.

As such, even when the work system group WS to be managed is diversified to cause the control of the schedule 700 to be complicated, in each of the event-data collecting process threads Ta1 to Tan, the start state of the storing process thread Tb can be monitored to terminate the relevant one of the event-data collecting process threads Ta1 to Tan for the work systems WS1 to WSn upon termination of the storing process thread Tb. Therefore, maintenance of the database 310, information changes, or the like can be performed without considering the start state of each of the work systems WS1 to WSn.

Figure 12:
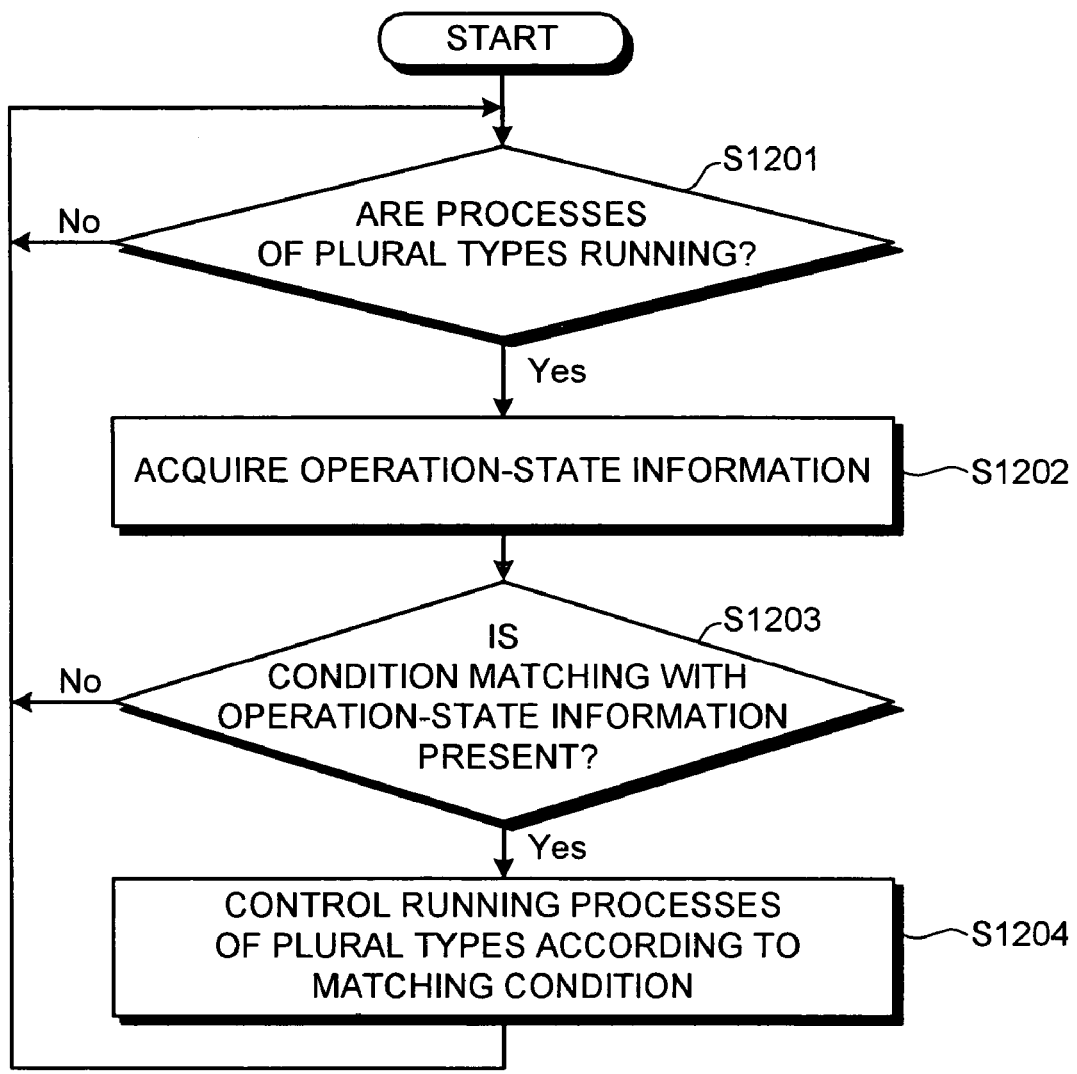
FIG. 12 is a flowchart of the work-process tracking process according to the embodiment.

In the work process tracking procedure, a priority set for each process and operation-state information as to the use rate of the CPU 201 or memory are used. FIG. 10 is a table correspondence between a process and priority. FIG. 11 is a table of a condition setting file. FIG. 12 still another flowchart of the work-process tracking process according to the embodiment.

As shown in FIG. 10, priorities 1 to 5 are set for the respective processes. The process with the priority 1 is a process to be performed with the highest priority. As shown in FIG. 11, a condition setting file 1100 indicates a correspondence between the operation state of the work process tracking apparatus 102 and the control of the control unit 302. In the condition setting file 1100, the operation-state information is defined by AND or OR of a use rate of the CPU 201 (CPU use rate) and a use rate of the memory (memory use rate).

For example, in a condition A, that is, when the CPU use rate is equal to or more than 100% and the memory use rate is equal to or more than 80%, the control unit 302 terminates processes with the priority 1 or lower, that is, all the processes shown in FIG. 10. In a condition C, that is, when either one of the CPU use rate and the memory use rate is equal to or more than 65%, processes with the priority 3 or lower, that is, the tracking process (priority 3), the alert-data collecting process (priority 4), and the backup process (priority 5), are terminated.

As shown in FIG. 12, it is determined whether processes of plural types are running (step S1201). If processes of plural types are not running ("NO" at step S1201), that is, if a single process is running or processes of a single type (for example, the event-data collecting process) is running, the determining process at step S1201 is repeated until processes of plural types are running.

If processes of plural types are running ("YES" at step S1201), the condition setting file 1100 is read to acquire the operation-state information (step S1202). Next, it is determined whether a condition matching with the operation-state information shown in FIG. 11 is present (step S1203). If no matching condition is present ("NO" at step S1203), the procedure goes to step S1201.

On the other hand, if a matching condition is present ("YES" at step S1203), the running processes of plural types are controlled according to the matching condition (step S1204). For example, when the CPU use rate is 67% and the memory use rate is 50%, the operation state matches with the condition C shown in FIG. 11. Therefore, processes with the priority 3 or lower, that is, the tracking process (priority 3), the alert-data collecting process (priority 4), and the backup process (priority 5), are terminated.

As such, by acquiring the operation-state information that indicates the load on the CPU 201 or memory of the work process tracking apparatus 102, the load on the work process tracking apparatus 102 can be prevented from being increased due to concurrent processing. In particular, in consideration of the priority of each process, efficiency in processing can be increased. For example, when the tracking results on a real-time basis are sought even at the expense of load on the work process tracking apparatus 102, the tracking process is allowed to be performed even with an overlap with the event-data collecting process. With this, accurate tracking results can be obtained on a real-time basis. On the other hand, the load on the work process tracking apparatus 102 matches with the condition C, the event-data collecting process is allowed to be performed, but the tracking process is prohibited from being performed. Thus, the load on the work process tracking apparatus 102 can be reduced.

As shown in FIG. 11, when the operation-state information that indicates the load on the CPU 201 and the memory of the work process tracking apparatus 102, since the CPU use rate or the memory use rate is momentarily increased, an average value of the CPU use rate or the memory use rate is calculated at predetermined intervals, and then it is determined whether the calculated average value matches with any one of the conditions A to E. Thus, an error operation of the control unit can be prevented.

As described, with the work process tracking apparatus according to the embodiment, with the expansion in size and diversification of the work processes to be tracked, even if the number of work systems WS1 to WSn to be managed n is increased, the event-data collecting process can be terminated for each of the work systems WS1 to WSn, for example, at the time of maintenance or of changing information of any of the work systems WS1 to WSn. Therefore, operability of the work process tracking apparatus 102 can be improved.

When the storing process thread Tb is terminated during the execution of the event-data collecting process, the collected event data cannot be stored in the database 310. To solve this problem, by automatically detecting the termination of the storing process, the event-data collecting process Ta can be terminated. Thus, by preventing an unnecessary event-data collecting process, the load on the work process tracking apparatus 102 can be reduced.

Moreover, it is possible to set processes that can be concurrently performed according to the priority or by monitoring the operation state (the load on the work process tracking apparatus 102), thereby achieving an efficient tracking process.

While in the embodiment described above, the priorities of the processes shown in FIG. 10 and the condition setting file 1100 shown in FIG. 11 are used to control the executing unit 301, only the priorities of the processes shown in FIG. 10 may be used to control the executing unit 301. For example, when a new process is started while another process is running, the new process can be allowed to be started when the priority level of the new process is higher than that of the running process, and the new process can be prohibited to be started when the priority level of the new process is lower than that of the running process. Thus, the execution of the process can be controlled according to the priority, thereby achieving efficient management of tracking The work-process tracking process described in the present embodiment can be achieved by a computer, such as a personal computer or a work station executing a computer program provided in advance. The computer program is recorded on a computer-readable recording medium, such as a hard disk, a flexible disk, a CD-ROM, an MO disk, or a DVD, and is executed by being read from the recording medium by a computer. Also, this program may be a transfer medium that can be distributed via a network, such as the Internet.

According to the present invention, easy and efficient operation and management of a work-process tracking system can be achieved.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A tracking apparatus controlled by a computer, the tracking apparatus comprising:

a collecting unit, the computer making the collecting unit collect, from each of a plurality of work systems, data regarding an execution of a work performed in each of the work systems and including identification information of a subject of the work and information about the time of execution of the work;

a first storing unit, the computer making the first storing unit store therein the data collected by the collecting unit;

an extracting unit, the computer making the extracting unit extract, from the data stored in the first storing unit, data that includes identical identification information;

an output unit, the computer making the output unit output the extracted data in time sequence based on the information about the time of execution of work included in each of the extracted data; and a control unit, the computer making the control unit cause each of the collecting unit, the first storing unit, the extracting unit, and the output unit to start a process at a start time that is set in advance for each of the collecting unit, the first storing unit, the extracting unit, and the output unit, wherein the collecting unit, the first storing unit, the extracting unit, and the output unit perform their respective processes under control of the control unit;

the tracking apparatus further comprising:

an alert-data collecting unit, the computer making the alert-data collecting unit collect, from the data stored in the first storing unit, alert data that indicates abnormality in a process performed by any one of the work systems;

a second storing unit, the computer making the second storing unit store therein the alert data stored in the first storing unit;

wherein the control unit causes each of the second storing unit and the alert-data collecting unit to start a process at a start time that is set in advance for each of the second storing unit and the alert data collecting unit; and an acquiring unit that acquires information on an operational state of a process performed under control of the control unit, wherein the control unit causes a process with a low priority to be terminated based on information on priority of processes performed by the collecting unit, the first storing unit, the extracting unit, the second storing unit, and the alert-data collecting unit, and the acquired information on the operational state.

2. The tracking apparatus according to claim 1, wherein the collecting unit collects the data regarding the execution of the work by a plurality of threads provided for the work systems, respectively, and the control unit sets up a plurality of threads corresponding to the work systems at respective start times that are set in advance for the work systems.

3. The tracking apparatus according to claim 1, further comprising a detecting unit, the computer making the detecting unit detect a termination of a process performed by the first storing unit, wherein when the detecting unit detects the termination of the process performed by the first storing unit during an execution of a process performed by the collecting unit, the control unit causes the collecting unit to terminate the process.

4. The tracking apparatus according to claim 1, wherein the control unit causes the process that has been started at the start time to be terminated based on a termination time that is set in advance for each of the collecting unit, the first storing unit, the extracting unit, and the alert-data collecting unit.

5. A method for tracking work processes, the method comprising:

collecting, from each of a plurality of work systems, data regarding an execution of a work performed in each of the work systems and including identification information of a subject of the work and information about the time of execution of the work;

storing the data collected by the collecting unit to a first storing unit;

extracting, from the data stored in the first storing unit, data that includes identical identification information; and outputting the extracted data in time sequence based on the information about the time of execution of work included in each of the extracted data;

collecting from the stored data, alert data that indicates abnormality in a process performed by any one of the work systems;

storing the alert data stored in the first storing unit to a second storing unit;

acquiring information on an operational state of a process performed, and controlling each of the collecting, the storing to the first storing unit, the extracting, the outputting, the collecting from the stored data, and the storing to the second storing unit to start a process at a start time that is set in advance for each of the collecting, the storing to the first storing unit, the extracting, the outputting, the collecting from the stored data, and the storing to the second storing unit so as to control the collecting, the storing to the first storing unit, the extracting, the outputting, the collecting from the stored data, and the storing to the second storing unit, the controlling further causing a process with a low priority to be terminated based on information on priority of processes performed by the collecting, the storing to the first storing unit, the extracting, the storing to the second storing unit, and the alert-data collecting, and the acquired information on the operational state.

6. A non-transitory recording medium having recorded a computer program therein, the computer program being executed by a computer for:

collecting, from each of a plurality of work systems, data regarding an execution of a work performed in each of the work systems and including identification information of a subject of the work and information about the time of execution of the work;

storing the collected data to a first storing unit;

extracting, from the stored data, data that includes identical identification information outputting the extracted data in time sequence based on the information about the time of execution of work included in each of the extracted data;

collecting, from the stored data, alert data that indicates abnormality in a process performed by any one of the work systems;

storing the alert data stored in the first storing unit to a second storing unit;

acquiring information on an operational state of a process performed, and controlling each of the collecting, the storing to the first storing unit, the extracting, the outputting, the collecting from the stored data, and the storing to the second storing unit to start a process at a start time that is set in advance for each of the collecting, the storing to the first storing unit, the extracting, the outputting, the collecting from the stored data, and the first storing to the second storing unit so as to control the collecting, the storing to the first storing unit, the extracting, the outputting, the collecting from the stored data, and the storing to the second storing unit, the controlling further, causing a process with a low priority to be terminated based on information on priority of processes performed by the collecting, the storing to the first storing unit, the extracting, the storing to the second storing unit, and the alert-data collecting, and the acquired information on the operational state.

* * * * *